(No Model.)
E. H. SEDDON.
FLEXIBLE WHEEL TIRE.
No. 508,991. Patented Nov. 21, 1893.
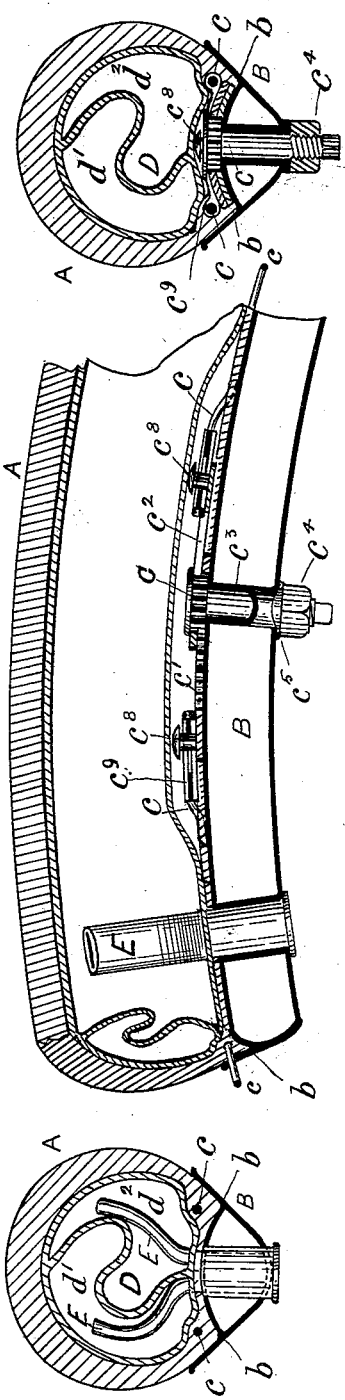
WITNESSES =
INVENTOR =
Edward Henry Seddon
by his attorney
R. J. Urquhart

UNITED STATES PATENT OFFICE.

EDWARD HENRY SEDDON, OF BROOKLANDS, ENGLAND.

FLEXIBLE WHEEL-TIRE.

SPECIFICATION forming part of Letters Patent No. 508,991, dated November 21, 1893.

Application filed August 1, 1891. Serial No. 401,421. (No model.) Patented in England April 11, 1891, No. 6,197; in Germany August 24, 1891, No. 61,158; in Belgium August 24, 1891, No. 96,140, and in France August 27, 1891, No. 215,762.

*To all whom it may concern:*

Be it known that I, EDWARD HENRY SEDDON, a subject of the Queen of Great Britain and Ireland, and a resident of Brooklands, in the county of Chester, England, have invented new and useful Improvements in Flexible Wheel-Tires of Velocipedes and other Road-Carriages, (for which I have obtained patents as follows: in England April 11, 1891, No. 6,197; in Germany August 24, 1891, No. 61,158; in Belgium August 24, 1891, No. 96,140, and in France August 27, 1891, No. 215,762,) of which the following is a specification.

This invention relates more particularly to hollow flexible wheel-tires of velocipedes and other road carriages hereinafter termed "cycles" for the sake of brevity, and is fully described in the following statement and accompanying drawings.

In the said drawings Figure 1 is a longitudinal section of a tire and Fig. 2 a cross section of the same showing the manner in which I propose to secure the tire to the felly or rim. Fig. 3 is a plan of the detail of the fastening. Fig. 4 is a side view of the fastening. Fig. 5 is a cross section of a flexible tire having a hollow core with longitudinal compartments and shows the position of the non-return valve.

Referring to Figs. 1 and 2: A is the tire; B the rim or felly; C the fastening device which draws together the extremities of the band $c$ passed through the tire. The rim or felly B here shown is of a tubular section, but I do not confine myself to any particular form or section of rim which may be tubular or solid, provided there be two channels $b$ formed in the periphery thereof in the positions shown. The band $c$ is a duplicate one and is provided at each end with a suitable attachment to the fastening hereinafter described.

Referring now to Figs. 3 and 4 also which show the fastening C in detail, the said fastening consists essentially of a rack which is moved by a pinion. If one rack only were employed, one end of the band $c$ would necessarily have to be secured to the rim, the other end being jointed to and drawn up with the rack, so taking up the slack in the band in one direction. I prefer however, to employ two rack plates $c'$ $c^2$ which I place one above the other as shown in Figs. 1, 2 and 4, the positions of the racks in each plate to one another being reversed, in the order shown in Fig. 3. A pinion $c^3$ formed upon a short spindle engages in the teeth of the racks and when turned moves them in opposite directions thus drawing together the two ends of the attached band or slackening the same according to the direction in which the pinion is turned. The spindle of the pinion is screwed and provided with a locknut $c^4$, and washer $c^5$ if deemed necessary the end of the spindle having a formation to fit a key to be turned thereby. The spindle passes through the rim which forms a bearing therefor. Upon the plates are fitted studs $c^8$, and the extremities of the band $c$ are formed for attachment thereto preferably as shown at $c^9$.

Referring now to Fig. 5 which shows a tire in section, secured to a channeled rim in the manner hereinbefore described; the hollow core D is formed with longitudinal compartments $d'$ $d^2$ each fitted with a separate non-return valve E all of which valves communicate with one mouthpiece only. The object in having a longitudinally divided core is that the liability of the said tire to total collapse in event of puncture is considerably reduced, as in the event of one compartment being punctured the remaining one or others may be fully inflated and force out the air in the punctured compartment occupying the space thereof, the partitions or webs between the compartments being made as shown on the drawings of such width that each compartment can be inflated to the full size of the hollow core. The valve E is formed as a flattened tube of india rubber, expanded at the mouth and secured in any convenient manner.

I claim—

1. The combination with the rim of a cycle wheel of a flexible tire A having a hollow core D with longitudinal compartments $d'$ $d^2$ each provided with a non-return valve E and a duplicate band $c$ with fastening device C consisting of rack plates $c'$ $c^2$ or one of them, pinion $c^3$ locknut $c^4$ and connections $c^9$ as set forth.

2. The combination with the rim of a cycle wheel of a flexible tire having a hollow core divided into longitudinal compartments by a flexible partition, in such manner that each compartment can be inflated to the full size of said core, and a non return valve to each of said compartments.

3. The combination with the tire of a cycle wheel, of a flexible tire having a hollow core divided into longitudinal compartments in such a manner that each compartment can be inflated to the full size of said core, a non-return valve to each of said compartments, independent bands passed through said tire at each side of the rim, and fastening devices for said bands.

4. The combination with the rim of a wheel, of a flexible and hollow tire encircling the said rim, and a flexible partition within the tire and extending throughout the length thereof, said partition being in width, equal at least to the internal periphery of the tire, measured between the points where the partition joins the said tire.

5. In combination with the felly of a wheel, a flexible cylindrical and hollow tire longitudinally divided into compartments by a flexible partition, whose width is greater than the diameter of the said cylinder, and provided with holes laterally placed in reference to said felly, bands passing through said holes, and means for joining the ends of said bands.

In testimony that I claim the foregoing as my invention I have signed my name, in presence of two witnesses, this 23d day of June, 1891.

EDWARD HENRY SEDDON.

Witnesses:
J. ALBERT FALLOWS,
W. M. GEDDES.